United States Patent Office 2,757,769
Patented Aug. 7, 1956

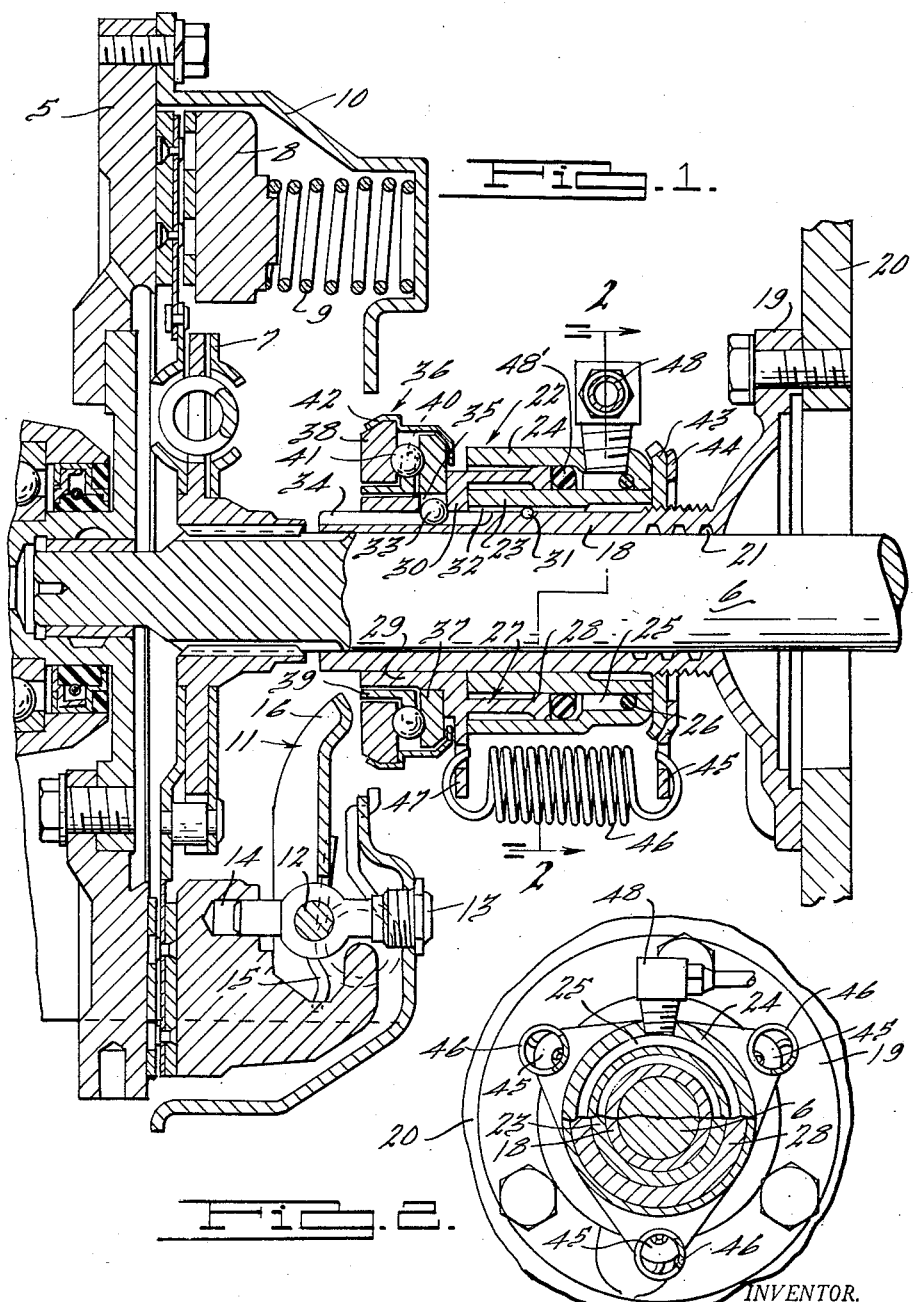

2,757,769

CLUTCH

Harold E. Roise, Pontiac, Mich., assignor to Chrysler Corporation, Highland Park, Mich., a corporation of Delaware Application December 17, 1952, Serial No. 326,456

7 Claims. (Cl. 192—91)

This invention relates to improvements in clutches and more particularly to friction drive clutches, although not necessarily limited thereto.

An object of the invention is to provide an improved power operated mechanism for releasing the drive through a clutch and particularly by relatively separating the drive elements of a friction clutch.

A further object of the invention is to provide an operating mechanism for a clutch including a wall structure defining a fluid pressure receiving chamber and a power operator actuated by fluid pressure in the cylinder and carrying a bearing unit forming a thrust transmitting connection between the power operator and clutch release means, the aforesaid components being arranged in concentric relationship with a structural member driven by the friction clutch.

Another object of the invention is to provide an arrangement of the foregoing components such that the thrust connection between the bearing unit and clutch release means is broken during transmission of drive through the friction clutch; to provide spring biasing of the operator to a position to release said thrust transmitting connection and to engage the wall structure with a stop therefor; and the stop being adjustable to shift the aforesaid components as a unitary structure relative to the clutch release means. Such shifting compensates for positional change of the clutch release means resulting from wear of the friction elements of the clutch and has the advantage of maintaining a constant degree of spring biasing.

Other objects and advantages of the invention will be more apparent from the following description taken in conjunction with the accompanying drawings, in which:

Fig. 1 is a sectional elevational view of a friction clutch and the operating mechanism therefor embodying the invention;

Fig. 2 is a vertical sectional view taken on line 2—2 of Fig. 1.

Referring to the drawings, the invention is illustrated and described in a friction drive clutch of the well known type currently used and includes a driving disc or flywheel 5 in which is journalled one end of a driven shaft 6 which may be the input drive shaft for a multi-ratio change speed mechanism, not shown. A friction drive disc 7 is splined on shaft 6 and is maintained in frictional driving engagement with flywheel 5 by a pressure ring 8 under the influence of a plurality of circumferentially spaced pressure springs, one of which is shown at 9, acting between the ring 8 and a cover 10 bolted to the flywheel 5. To release the drive through the clutch, the flywheel 5 and disc 7 are relatively separated by withdrawing the pressure ring 8 against the resistance of springs 9 and thus withdrawal is forcibly effected by rotation of a plurality of circumferentially spaced release levers, one of which is shown at 11. Each lever 11 is mounted on a release lever pin 12 which extends through the eye of bolt 13, the latter extending through an opening in the cover 10 in threaded engagement with the wall of the opening, and the end of bolt 13 sliding in an opening 14 in the ring 8. The mounting of the lever 11 provides a relatively short lower arm 15 and a relatively long upper arm 16 adapted to receive an operating thrust to rotate the arm in an anti-clockwise direction as viewed in Fig. 1. As a result of this rotation the lower arm 15 acts on the pressure ring 8 to move the same axially away from the disc 7 against the resistance of springs 9 and the disc 7 is thereby released from its driving engagement with the flywheel 5. When the levers 11 are relieved of such thrust the springs 9 re-establish the frictional drive engagement.

The shaft 6 may constitute the input drive shaft for a change speed mechanism, not shown, and is journalled in a sleeve-like member 18 having a radial flange 19 at one end thereof adapted to be detachably connected to the housing 20 for the change speed mechanism. The member 18 is thus stationary rotatively and axially and has a threaded section 21 to direct lubricant in a direction away from the friction clutch.

The mechanism for operating the clutch release levers 11 is mounted on the member 18 concentric with the latter and the shaft 6 and comprises a sleeve-like wall structure generally indicated by the numeral 22. This structure includes an inner tubular sleeve 23 and an outer sleeve 24 of larger diameter than sleeve 23 to provide a chamber or cylinder 25 therebetween adapted to receive fluid under pressure. This cylinder is open at one end and closed at the other end by deflecting the outer sleeve end inwardly to abut the inner sleeve and spinning such sleeve end over the adjacent end of the inner sleeve. The connection need not be leak-proof inasmuch as a seal 26 can be employed, but is sufficient to hold the sleeves for unitary movement and against relative rotation.

The operating mechanism further includes a sleeve-like piston, generally indicated by the numeral 27, having a part 28 of relatively large diameter which extends into cylinder 25 and an end part 29 of relatively small diameter. A radially directed flange 30 is provided at the juncture of the parts 28, 29, the radially inner part of which abuts the end face of the inner sleeve 23 and the radially outer part of which abuts the end face of outer sleeve 24 when the piston is in its retracted at rest position. The inner sleeve 23 is retained against rotation by a plurality of circumferentially spaced balls, one of which is shown at 31, each ball seating in an individual recess in the member 18 and a key-way 32 in sleeve 23; and the piston is retained against rotation by a plurality of balls, one of which is shown at 33, each received in a key-way 34 in member 18 and an individual recess 35 in piston part 29.

A bearing unit 36 is mounted on piston part 29 for axial movement with the piston 27, and includes a first race 37 pressed onto the part 29 and thereby retained against rotation relative thereto. A second bearing race 38 is journalled on a separator 39 which is journalled on the piston part 29. The separator has circumferentially spaced radial projections, one of which is shown at 40, which extend between adjacent balls 41 of the bearing. The bearing unit is provided with a lubricant retaining cover 42 fixed to the race 38 for axial and rotative movements therewith and for rotation relative to race 37.

The wall structure 22, piston 27 and bearing unit 36 are axially slidable on the member 18 and are positioned thereon with a predetermined clearance between the bearing race 38 and release levers 11 when the power piston 27 is at rest or in retracted position. This positioning is effected by a disc 43 threaded onto member 18 and acting as an abutment for the wall structure 22. A washer 44 abuts the disc 43 and has three ears, one of which is shown at 45, which extend outwardly beyond disc 43, and three symmetrically arranged coil springs 46, each of which is connected to a respective ear 45 and a radial extension 47 of piston flange 30. The springs 46 bias the wall structure 22, piston 27 and bearing unit 36 to engage the wall structure with the abutment disc 43 and by threading the disc 43 axially relative to member 18 the biased structure and springs can be shifted as a unit to compensate for any change in the relative positions of the release levers 11 and bearing race 38 due to wear of the driving friction surfaces and the resulting change in position of levers 11. The spring loading remains constant inasmuch as the interconnected parts are shifted as a unit.

Fluid under pressure is admitted to the cylinder or chamber 25 through an opening at 48 from any suitable source and by way of example and not limitation such source may be a master cylinder of the type commonly employed in brakes for motor vehicles and illustrated in U. S. Patent No. 1,988,395. However, the mechanism herein can be operated without the retention of residual pressure as commonly employed in the above brake master cylinders. A resilient ring seal 48' is provided to seal between the piston and cylinder.

In operation of the mechanism the clutch is illustrated with the friction drive parts engaged for transmitting drive to shaft 6, and the bearing unit 36 is spaced from the release levers 11. For releasing the drive through the clutch, fluid under pressure is admitted to cylinder 25 and the piston 27 and bearing unit 36 are moved to the left as viewed in Fig. 1 to engage the bearing race 38 with the long arm 16 of each lever 11 to rotate the levers in a counterclockwise direction as viewed in Fig. 1. During such rotation the lever arms 15 withdraw the pressure ring 8 against the resistance of springs 9, and thus release the disc 7 from driving engagement with flywheel 5. The race 38 and cover 42 rotate with levers 11 during the thrust transmitting engagement of race 38 with the rotating levers 7. When the fluid pressure in cylinder 25 is relieved the springs 46 return the piston and bearing unit to the illustrated at rest position of the piston.

Various changes including the size, shape and arrangement of parts may be made without departing from the spirit of the invention and it is not my intention to limit the invention other than by the claims.

I claim:

1. In a friction clutch mechanism for releasably drivingly connecting a shaft with a driver, clutch release elements rotatable in one direction to release the drive through the mechanism, and means for rotating said elements in said one direction including a first sleeve concentric with said shaft and having spaced walls defining a chamber adapted to receive fluid under pressure, a second sleeve concentric with said shaft and extending into said chamber, said second sleeve being axially movable by pressure fluid in said chamber, an abutment adjacent one end of said first sleeve, and a bearing unit mounted on said second sleeve for axial movement therewith and engaging said elements during said axial movement to rotate said elements in said one direction, said second sleeve having a flange extending radially outwardly beyond said first sleeve and adapted to abut an end face thereof, and a retracting spring for said second sleeve having one of its ends engaged with said radial flange and the other end engaged with said abutment, said radial flange abutting an end face of said first sleeve when said second sleeve is in its retracted position.

2. In a friction clutch mechanism for releasably drivingly connecting a shaft with a driver, clutch release elements rotatable in one direction to release the drive through the mechanism, and means for rotating said elements in said one direction including a first sleeve concentric with said shaft and having spaced walls defining a chamber adapted to receive fluid under pressure, a second sleeve concentric with said shaft and extending into said chamber, said second sleeve being axially movable by pressure fluid in said chamber, a bearing unit mounted on said second sleeve for axial movement therewith and engaging said elements during said axial movement to rotate said elements in said one direction, an abutment limiting axial movement of said first sleeve by fluid pressure in said chamber, a retracting spring for said second sleeve acting between the latter and said abutment, said abutment being mounted for movement to shift said sleeves, said spring and said bearing unit as a unitary structure axially relatively to said shaft to thereby adjustably position the same relative to said clutch release elements with a predetermined spacing between said bearing unit and said elements.

3. In a friction clutch mechanism for releasably drivingly connecting a shaft with a driver, clutch release elements rotatable in one direction to release the drive through the mechanism, and means for rotating said elements in said one direction including a first sleeve concentric wtih said shaft and having spaced walls defining a chamber adapted to receive fluid under pressure, a second sleeve concentric with said shaft and extending into said chamber, said second sleeve being axially movable by pressure fluid in said chamber, a bearing unit mounted on said second sleeve for axial movement therewith and engaging said elements during said axial movement to rotate said elements in said one direction, an abutment engaged with one end of said first sleeve, and a spring connected to said second sleeve and to said abutment yieldably opposing said fluid pressure actuation of said second sleeve, said spring acting through said second sleeve, when the latter is relieved from its said fluid pressure actuation, to bias said first sleeve into engagement with said abutment and to bias said bearing unit into spaced relationship with said clutch release elements.

4. In a friction clutch mechanism operable to releasably transmit drive between driving and driven structures and including rotatable friction drive parts relatively separable to release the drive through said mechanism, thrust receiving elements rotatable with one of said friction drive parts and operable to relatively separate said parts as aforesaid, operating means for said elements including a wall structure defining a fluid pressure receiving chamber, a piston including a first part slidable in said chamber and a second part integral with said first projecting from said chamber and adapted to abut one end of said wall structure when said piston is at rest, an abutment at the other end of said wall structure, and a bearing unit mounted on said piston second part for movement therewith during fluid pressure actuation of said piston, said bearing unit including a race in rotating thrust transmitting engagement with said elements during said piston actuation and disposed out of said thrust transmitting engagement when said piston is at rest, and a spring engaged at one end thereof with said piston and at the other end with said abutment biasing said piston second part into abutting engagement with said wall structure.

5. In a friction clutch mechanism operable to releasably transmit drive between driving and driven structures and including rotatable friction drive parts relatively separable to release the drive through said mechanism, thrust receiving elements rotatable with one of said friction drive parts and operable to relatively separate said parts as aforesaid, operating means for said elements including a wall structure defining a fluid pressure receiving chamber, a piston including a first part slidable in said chamber and a second part projecting from said chamber and adapted to abut said wall structure when said piston is at rest, a bearing unit mounted on said piston second part for movement therewith during fluid pressure actuation of said piston, said bearing unit including a race in rotating thrust transmitting engagement with said elements during said piston actuation and disposed out of said thrust transmitting engagement when said piston is at rest, an abutment for said wall structure adjustable to shift said wall structure, said piston and said bearing unit as a unitary structure relative to said release elements to thereby compensate for change in position of said release elements as an incident to wear of said friction drive parts, and a spring engaged with said piston and said abutment operable to bias said piston into abutting engagement with said wall structure.

6. In a friction clutch operable to releasably transmit drive between driving members and including rotatable parts relatively separable to release the drive, release elements rotatable with one of said parts and movable relative thereto to relatively separate said parts, a wall structure defining a fluid pressure receiving cylinder, a piston movable in its power stroke by fluid pressure in said cylinder, a bearing unit fixedly mounted on said piston for movement therewith and operable during the power stroke of said piston to transmit thrust to said release means to move the latter as aforesaid, a retracting spring for said piston, and an abutment for said wall structure movable in a direction to shift said wall structure, piston and spring thereby to adjustably position said bearing unit relative to said release fingers when the piston is retracted.

7. In a friction clutch operable to releasably transmit drive between driving members and including rotatable parts relatively separable to release the drive, release elements rotatable with one of said parts and movable relative thereto to relatively separate said parts, a wall structure defining a fluid pressure receiving cylinder, a piston movable in its power stroke by fluid pressure in said cylinder, said piston including a first annular sleeve part extending into said chamber and a second part projecting from said cylinder, said second part including a sleeve forming a seat and having a radially extending abutment engaged with said wall structure when said piston is in an at rest position, a bearing unit mounted on said sleeve seat for movement therewith and operable during the power stroke of said piston to transmit thrust to said release means to move the latter as aforesaid, an axially movable abutment for said wall structure, and a spring acting between said piston and the last mentioned abutment biasing said piston to engage its said radial abutment with said wall structure, said wall structure, piston, bearing unit and spring being axially shiftable as a unit by axial movement of the last mentioned abutment to thereby position said bearing unit relative to said release elements when said piston is in an at rest position.

References Cited in the file of this patent

UNITED STATES PATENTS

| | | |
|---|---|---|
| 1,864,126 | Ferris | June 21, 1932 |
| 2,068,579 | Tatter | Jan. 19, 1937 |
| 2,501,005 | Rockwell | Mar. 21, 1950 |
| 2,587,230 | Schaad | Feb. 26, 1952 |

FOREIGN PATENTS

| | | |
|---|---|---|
| 17,167 | Great Britain | Aug. 5, 1910 |
| 765,330 | France | Mar. 19, 1934 |